United States Patent
Kim et al.

(10) Patent No.: US 11,679,786 B2
(45) Date of Patent: Jun. 20, 2023

(54) APPARATUS FOR CONTROLLING AUTONOMOUS DRIVING OF A VEHICLE, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventors: Hee Kyung Kim, Seoul (KR); Jin Su Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 346 days.

(21) Appl. No.: 16/995,488

(22) Filed: Aug. 17, 2020

(65) Prior Publication Data

US 2021/0300431 A1 Sep. 30, 2021

(30) Foreign Application Priority Data

Mar. 24, 2020 (KR) .......................... 10-2020-0035725

(51) Int. Cl.
*B60W 60/00* (2020.01)
*B60W 10/18* (2012.01)
(Continued)

(52) U.S. Cl.
CPC ........ *B60W 60/0059* (2020.02); *B60W 10/18* (2013.01); *B60W 40/06* (2013.01);
(Continued)

(58) Field of Classification Search
CPC .. B60W 60/0059; B60W 10/18; B60W 40/06; B60W 50/12; B60W 60/0053;
(Continued)

(56) References Cited

U.S. PATENT DOCUMENTS

| 2015/0120124 A1* | 4/2015 | Bartels | .................. B60W 50/10 701/23 |
| 2018/0111628 A1 | 4/2018 | Tamagaki et al. | |
| 2020/0307646 A1* | 10/2020 | Kato | ................. B60W 60/0054 |

FOREIGN PATENT DOCUMENTS

EP 2 314 490 A1 4/2011

OTHER PUBLICATIONS

European Search Report dated Feb. 8, 2021 from the corresponding European Application No. 20188874.0, 10 pp.

* cited by examiner

*Primary Examiner* — Alan D Hutchinson
(74) *Attorney, Agent, or Firm* — Lempia Summerfield Katz LLC

(57) ABSTRACT

An autonomous driving control apparatus for a vehicle includes: a processor that determines whether a current driving condition of the vehicle is a limit situation during an autonomous driving control, performs a demand for control authority transition to a user during the autonomous driving control when the current driving condition is the limit situation, and starts a minimum risk maneuver to transmit a signal for disabling reactivation of the autonomous driving control when control authority is not transferred to the user; and a storage to store a set of instructions and driving condition data to be used by the processor. In particular, the processor demands for engagement of an electronic parking brake device when the vehicle is stopped after the minimum risk maneuver ends.

20 Claims, 6 Drawing Sheets

(51) Int. Cl.
*B60W 40/06* (2012.01)
*B60W 50/12* (2012.01)

(52) U.S. Cl.
CPC ........ *B60W 50/12* (2013.01); *B60W 60/0053* (2020.02); *B60W 2520/04* (2013.01)

(58) Field of Classification Search
CPC ......... B60W 2520/04; B60W 2420/00; B60W 2552/00; B60W 2710/186; B60W 10/04; B60W 10/182; B60W 10/184; B60W 10/20; B60W 60/0061; B60W 2050/146; B60W 2520/28; B60W 60/0015; B60W 60/005; B60W 2050/0005; B60W 2050/007; B60W 30/181; B60W 2050/0002; B60K 28/02; B60T 7/12

See application file for complete search history.

APPARATUS FOR CONTROLLING AUTONOMOUS DRIVING OF A VEHICLE, SYSTEM HAVING THE SAME AND METHOD THEREOF

CROSS-REFERENCE TO RELATED APPLICATION

This application claims priority to and the benefit of Korean Patent Application No. 10-2020-0035725, filed on Mar. 24, 2020, the entire contents of which are incorporated herein by reference.

FIELD

The present-disclosure relates to an autonomous driving control apparatus for a vehicle, a system including the same, and a method thereof, and more particularly, to a technique capable of protecting users from additional risks when stopping the vehicle.

BACKGROUND

The statements in this section merely provide background information related to the present disclosure and may not constitute prior art.

In the automobile industry, an autonomous driving system and a driving assistance system (hereinafter, for convenience of description, both autonomous driving and driving assistance are referred to as "autonomous driving") that partially enables autonomous driving have been developed.

The autonomous driving system may provide various functions such as maintaining a predetermined speed, maintaining a distance between vehicles, maintaining a lane, and changing a lane. The autonomous driving system may perform autonomous driving by using various devices such as sensors for sensing vehicle's external environment, sensors for sensing vehicle information, GPS, precision maps, user state sensing systems, steering actuators, acceleration and deceleration actuators, communication circuits, and control circuits (e.g., electronic control units (ECUs)).

The autonomous driving system may monitor user's condition, and may provide an appropriate minimum risk maneuver (MRM) according to the user's condition.

The above information disclosed in this Background section is only for enhancement of understanding of the background of the present disclosure, and therefore it may contain information that does not form the prior art that is already known to a person of ordinary skill in the art.

SUMMARY

An exemplary form of the present disclosure provides an autonomous driving control apparatus for a vehicle, a system including the same, and a method thereof, capable of preventing additional risks that may occur after stopping the vehicle by automatically engaging an electronic parking brake (EPB) when the vehicle stops after a minimum risk maneuver (MRM) for autonomous vehicles.

The technical objects of the present disclosure are not limited to the objects mentioned above, and other technical objects not mentioned can be clearly understood by those skilled in the art from the description of the claims.

In one exemplary form of the present disclosure, an autonomous driving control apparatus for a vehicle includes: a processor configured to: determine whether a current driving condition of the vehicle is a limit situation during an autonomous driving control, demand to transfer a control authority to a user of the vehicle during the autonomous driving control when the current driving condition is the limit situation, and perform a minimum risk maneuver to transmit a signal for disabling reactivation of the autonomous driving control when the control authority is not transferred to the user; and a storage configured to store algorithms (i.e., a set of instructions) and data for determination and performance by the processor. In particular, the processor demands engagement of an electronic parking brake device when the vehicle is stopped after the minimum risk maneuver ends.

In an exemplary form, the processor may determines whether the current driving situation is the limit situation in which the autonomous driving control function is disabled or restricted based on road information or sensing information regarding driving conditions of the vehicle.

In an exemplary form, the processor may stop the autonomous driving control when the control authority is transferred to the user within a predetermined time or immediately after performing the minimum risk maneuver.

In an exemplary form, the processor may determine whether the vehicle is stopped after the minimum risk maneuver ends when the control authority is not transferred to the user within a predetermined time or immediately after performing the minimum risk maneuver.

In an exemplary form, the processor may transmit an engagement signal of the electronic parking brake device within a predetermined time or immediately after the vehicle is stopped.

In an exemplary form, the autonomous driving control apparatus may further include a communication device configured to transmit a signal for demanding engagement of the electronic parking brake device.

In an exemplary form, the processor may transmit the signal for disabling reactivation of an autonomous driving control function to at least one of an input device for inputting an autonomous driving control command, an output device for outputting an autonomous driving control state, or a device related to the autonomous driving control function in a vehicle.

An exemplary form of the present disclosure provides a vehicle system including: an electronic parking brake control device configured to control engagement of an electronic parking brake device; and an autonomous driving control apparatus configured to demand to transfer a control authority to a user when determining that a current driving condition is in a limit situation during autonomous driving control, and to start a minimum risk maneuver when control authority is not transferred to the user, to transmit a signal for disabling reactivation of an autonomous driving control function, wherein the autonomous driving control apparatus may demand engagement of the electronic parking brake device of the electronic parking brake control device when the vehicle is stopped after the minimum risk maneuver ends.

In an exemplary form, the electronic parking brake control device may determine whether the vehicle is stopped when demanded for the engagement of the electronic parking brake device from the autonomous driving control apparatus.

In an exemplary form, the electronic parking brake control device may allow the electronic parking brake device to be engaged to transmit an engagement completion signal to the autonomous driving control apparatus when the vehicle is determined to be in a stopped state.

In an exemplary form, the autonomous driving control apparatus may release the autonomous driving control function when the control authority is transferred to the user within a predetermined time or immediately after performing the minimum risk maneuver.

In an exemplary form, the vehicle system may further include an output device configured to output a signal for the demand for control authority transition or a signal for disabling reactivation of the autonomous driving control function.

In an exemplary form, the vehicle system may further include an input device configured to receive an autonomous driving control function command from a user.

In an exemplary form, the autonomous driving control apparatus may transmits the signal for disabling reactivation of the autonomous driving control function to at least one of the input device, the output device, and a device related to the autonomous driving control function in a vehicle.

An exemplary form of the present disclosure, an autonomous driving control method includes: determining, by a processor, whether a current driving condition corresponds to a limit situation in which an autonomous driving control is restricted; demanding, by the processor, to transfer a control authority to a user of a vehicle when the current driving condition corresponds to the limit situation and performing a minimum risk maneuver when the control authority transition is not permitted by the user; transmitting, by the processor, a signal for disabling reactivation of an autonomous driving control function; determining, by the processor, whether the vehicle is stopped after the minimum risk maneuver ends; and demanding, by the processor, engagement of an electronic parking brake device when the vehicle is stopped.

In an exemplary form, whether the current driving condition corresponds to the limit situation may be determined based on road information of a road on which the vehicle is driving, or sensing information regarding driving conditions of the vehicle.

In an exemplary form, the determining of whether the vehicle is stopped after the minimum risk maneuver ends may include releasing the autonomous driving control when the control authority is transferred to the user within a predetermined time or immediately after performing the minimum risk maneuver.

In an exemplary form, the determining of whether the vehicle is stopped after the minimum risk maneuver ends may include determining whether the vehicle is stopped after the minimum risk maneuver ends when the control authority is not transferred to the user within a predetermined time or immediately after performing the minimum risk maneuver.

In an exemplary form, the demanding of the engagement of the electronic parking brake device may include may transmit an engagement signal of the electronic parking brake device within a predetermined time or immediately after the vehicle is stopped.

An exemplary form of the present disclosure provides an autonomous driving control apparatus including: a processor configured to perform a demand for control authority transition of a user when determining that a current driving condition is a limit situation during autonomous driving control, to start a minimum risk maneuver when control authority is not transferred to the user, and to control it to ignore a reactivation command of the autonomous driving control function inputted from the user while performing the minimum risk maneuver; and a storage configured to store algorithms and data for determination and performance by the processor, wherein the processor demands for engagement of an electronic parking brake device when the vehicle is stopped after the minimum risk maneuver ends.

In an exemplary form, the processor may perform the reactivation command of the autonomous driving control function when the vehicle is stopped after the minimum risk maneuver is started and the reactivation command of the autonomous driving control function is inputted from the user after the vehicle is restarted.

In this technique, when the vehicle stops after a MRM starts, a EPB is automatically engaged to prevent dangers that may occur after the vehicle stops, such as the vehicle leaving a driving lane due to user's misoperation.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
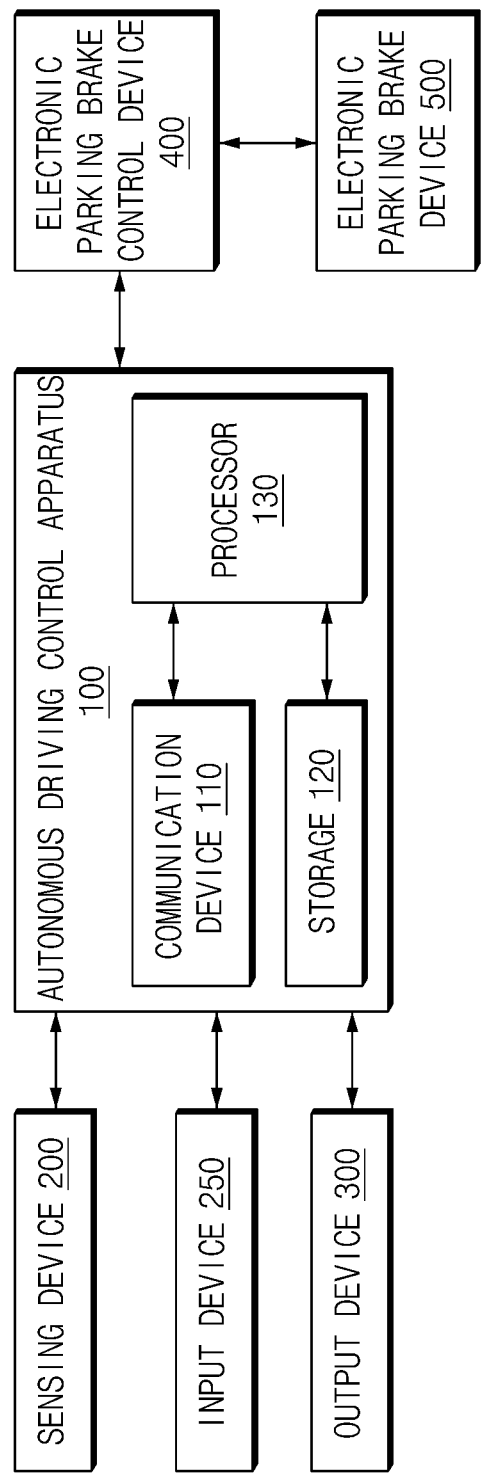
FIG. 1 illustrates a block diagram showing a configuration of a vehicle system including an autonomous driving control apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary forms of the present disclosure, when it is determined that detailed descriptions of related well-known configurations or functions interfere with understanding of the exemplary forms of the present disclosure, the detailed descriptions thereof will be omitted.

In describing constituent elements according to an exemplary form of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary forms of the present disclosure will be described in detail with reference to FIG. 1 to FIG. 5.

FIG. 1 illustrates a block diagram showing a configuration of a vehicle system including an autonomous driving control apparatus according to an exemplary form of the present disclosure.

Referring to FIG. 1, the vehicle system includes: an autonomous driving control apparatus 100 for a vehicle, a sensing device 200, an input device 250, an output device 300, and an electronic parking brake control device 400, and an electronic parking brake device 500.

The autonomous driving control apparatus 100 may be implemented inside the vehicle. In this case, the autonomous driving control apparatus 100 may be integrally formed with internal control units of the vehicle, or may be implemented as a separate device to be connected to control units by a separate connection means.

The autonomous driving control apparatus 100 for may perform at least one function among a smart cruise control (SCC), a forward collision warning (FCW), a lane keeping assist (LKA), lane departure warning (LDW), a lane change alert (LCA), a highway driving assist (HDA), and a lane following assist (LFA).

The autonomous driving control apparatus 100 demands control authority transition of a user when a current driving condition is determined as a dangerous situation during autonomous driving control, and performs a minimum risk maneuver (MRM) to decelerate and stop the vehicle when the user does not permit the control authority transition. When the vehicle stops after performing the minimum risk maneuver, the automatic parking control device 500 may be controlled to be automatically engaged to release an autonomous driving control function in a state in which the vehicle maintains a stop, thereby preventing a dangerous situation due to a user's erroneous operation after the vehicle stops.

To this end, the autonomous driving control apparatus 100 may include a communication device 110, a storage 120, and a processor 130.

The communication device 110, which is a hardware device implemented with various electronic circuits to transmit and receive signals through a wireless or wired connection, may perform communications with devices in the vehicle by using a network communication technique in the vehicle in the present disclosure, and the communications with the devices in the vehicle may be performed through controller area network (CAN) communication, local interconnect network (LIN) communication, and flex-ray communication.

As an example, the communication device 110 may transmit and receive control signals and data with respect to the sensing device 200 and the electronic parking brake control device 400.

The storage 120 may store sensing results of the sensing device 200 regarding driving information of a vehicle, and data and/or algorithms (e.g., a set of instructions/commands) executed by the processor 130, and the like.

As an example, the storage 150 may store road information of a road on which the vehicle is driving. For example, the road information may include a map, and the like. For example, the road information may include information related to road types (e.g., an automobile road or a general road), road end points, and characteristics of lanes (e.g., confluence lanes, etc.)

The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, and may electrically control each component, and may be an electrical circuit that executes software commands, thereby performing various data processing and calculations described below.

The processor 130 may process signals transferred between constituent elements of the autonomous driving control apparatus 100 and the devices in the vehicle. The processor 130 may be, e.g., an electronic control unit (ECU), a micro controller unit (MCU), or other sub-controllers mounted in the vehicle.

The processor 130 may perform autonomous driving control. For example, the processor 130 may perform driving assistance control on the automobile road. In addition, the processor 130 may control activation of the autonomous driving control function or deactivation (release) of the autonomous driving control function.

The processor 130 may determine whether a current driving condition is in a limit situation in which the autonomous driving control function is not to able to operate, based on at least some of sensing information regarding driving conditions of the vehicle or road information of a road on which the vehicle is running under the autonomous driving control. Herein, the limit situation may include a deviation from an operation design area of the autonomous driving control function, and the like. That is, the autonomous driving control apparatus 100 may determine whether the current driving condition is in the limit situation, such as a road condition, vehicle behavior, or user misoperation, in which maintaining functions of lanes and distances between vehicles cannot be properly operated.

When it is determined that the current driving condition is in the limit situation, the processor 130 may demand to transfer a control authority to a user (e.g., a driver) of the vehicle. When the control authority transition is not permitted by the user, the processor 130 may perform the minimum risk maneuver. In this case, the minimum risk maneuver may include performing deceleration with a constant deceleration (e.g., 1 m/s$^2$) and stop control when the user does not permit the control authority transition despite the demand for the control authority transition for a predetermined time (e.g., 10 s).

As such, when the minimum risk maneuver is started, the processor 130 transmits a signal for disabling reactivation of the autonomous driving control function. That is, when the autonomous driving control function is released after the minimum risk maneuver is started, the autonomous driving control function may be started after the vehicle is restarted. Accordingly, the processor 130 may release the autonomous driving control function when the control authority is transferred to the user within a predetermined time or immediately after performing the minimum risk maneuver. In this case, the a signal for disabling reactivation of the autonomous driving control function may be transmitted to the input device 250, a device related to the autonomous driving in the vehicle, the output device 300, and the like.

The processor 130 may control the vehicle according to another strategy for a dangerous situation when a magnitude of the deceleration required for avoiding the dangerous situation is greater than a specified value. When the control authority is not transferred to the user within the predetermined time or immediately after the minimum risk maneuver is performed, the processor 130 may determine whether the vehicle is stopped after the minimum risk maneuver ends.

The processor 130 may transmit an electronic parking brake device engagement signal to the electronic parking brake control device 400 within a predetermined time or immediately after the vehicle is stopped.

The sensing device 200 may detect vehicle surrounding information. For example, the sensing device 200 may detect information (e.g., position, speed, and acceleration) related to an external object (e.g., vehicles, pedestrians, etc.) positioned in a front, rear, or side of the vehicle.

The sensing device 200 may detect vehicle information, e.g., positions, speeds, accelerations, steering angles, and the like of target vehicles, and a wheel speed of a host vehicle. To this end, the sensing device 200 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, a wheel speed sensor, etc.

The input device 250 may receive a command for, e.g., activation of the autonomous driving control function, from a user, and may be deactivated when receiving the signal for disabling reactivation of the autonomous driving control function transmitted from the autonomous driving control apparatus 100. Accordingly, when receiving the signal for disabling reactivation of the autonomous driving control function, although an autonomous driving control command is inputted from the user, the input device 250 prevents the autonomous driving control function from being activated unless the vehicle is restarted. That is, the input device 250 may transmit the autonomous driving control command inputted from the user to the autonomous driving control apparatus 100 after the vehicle is restarted, after receiving the signal for disabling reactivation of the autonomous driving control function.

The input device 250 may include a key button, and may include a mouse, a joystick, a jog shuttle, a stylus pen, and the like. In addition, the input device 250 may include soft keys implemented on the display.

The output device 300 may output notifications of, e.g., an activation or deactivation state of the autonomous driving control function, a demand for control authority transition, a message reporting that the autonomous driving control function cannot be reactivated. In addition, the output device 300 may provide a notification that the user of the vehicle can sensibly perceive. For example, the output device 300 may include a display, a voice output means such as a speaker, and/or a vibration motor. In this case, the display may include at least one of a liquid crystal display (LCD), a thin film transistor liquid crystal display (TFT LCD), a an organic light emitting diode display (OLED display), a flexible display, a field emission display (FED), and a 3D display. In this case, when a touch sensor formed of a touch film, a touch sheet, or a touch pad is provided on the display, the display may operate as a touch screen, and may be implemented in a form in which an input means and an output means are integrated.

The electronic parking brake control device 400 may control engagement of the electronic parking brake device 500.

When receiving a demand for the engagement of the electronic parking brake device 500 from the autonomous driving control apparatus 100, the electronic parking brake control device 400 may determine whether the vehicle is stopped.

When the vehicle is determined to be in a stopped state, the electronic parking brake control device 400 may allow the electronic parking brake device 500 to be engaged to transmit an engagement completion signal to the autonomous driving control apparatus 100.

The electronic parking brake device 500 is an electronic parking brake (EPB), which means that the brake is automatically locked when the vehicle is stopped, and then automatically released when the accelerator is depressed to start driving the vehicle. The electronic parking brake device 500 may generate a braking force to a parking brake in a manner that a driving motor is driven and a force is transferred to a cable under a control command of the electronic parking brake control device 400.

Figure 2:
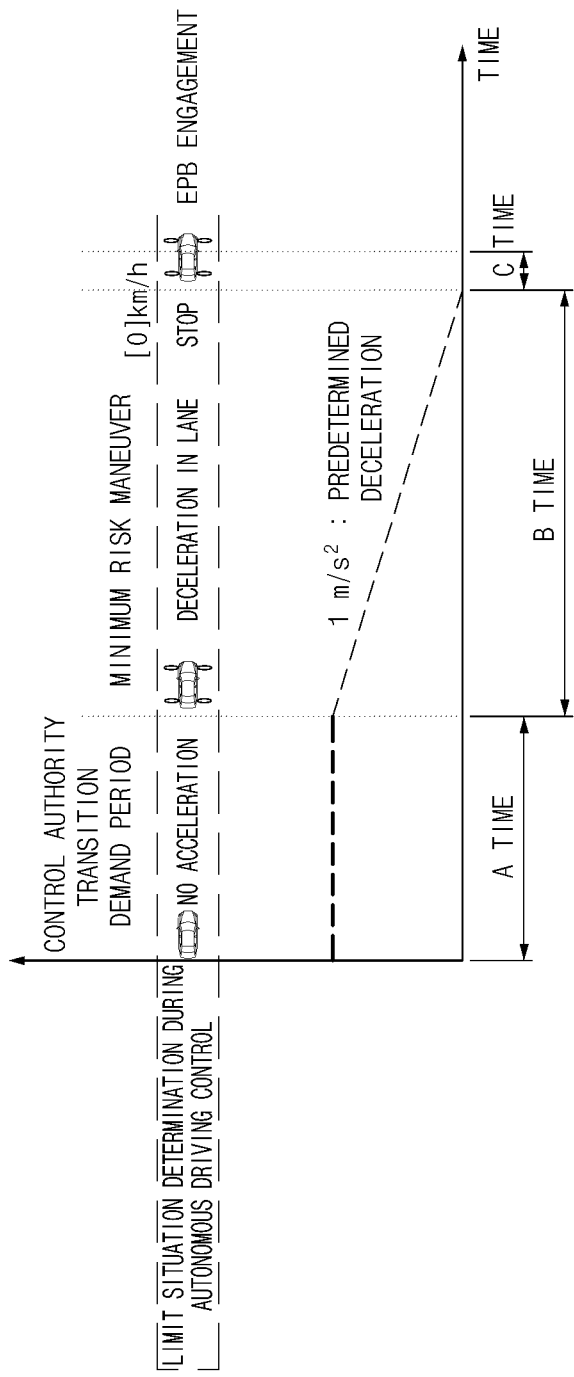
FIG. 2 illustrates an exemplary operation of an autonomous driving control apparatus for a vehicle according to an exemplary form of the present disclosure.

FIG. 2 illustrates an exemplary operation of an autonomous driving control apparatus according to an exemplary form of the present disclosure, showing an operation mechanism for control authority transition notification and minimum risk maneuver driving.

First, the autonomous driving control apparatus 100 determines whether the current driving condition is in the limit situation, such as a road environment, vehicle behavior, or user misoperation, in which maintaining functions of lanes and distances between vehicles cannot be properly operated, and notifies the user of the demand for control authority transition when it is determined that the current driving condition is in the limit situation. In this case, the autonomous driving control apparatus 100 may define a control authority transition demand period as A time (e.g., 10 s), and may make a setting so as not to accelerate the vehicle during the corresponding period. When the user does not permit the control authority transition within the predetermined time (A time) or immediately after a predetermined time after the limit situation occurs, the autonomous driving control apparatus 100 enters a minimum risk maneuver step. The autonomous driving control apparatus 100 continuously demands the control authority transition of the user even in the minimum risk maneuver step. The autonomous driving control apparatus 100 performs deceleration control with a predetermined deceleration (e.g., 1 m/s$^2$) during a minimum risk maneuver driving period, and performs stop control within a predetermined B time (e.g., up to 30 seconds at the maximum) or immediately.

The autonomous driving control apparatus 100 demands engagement of the electronic parking brake (EPB) of the electronic parking brake control device 400 within a predetermined C time (e.g., 1 s) or immediately after the minimum risk maneuver driving, and ends the autonomous driving control function when confirming the engagement of the EPB.

Figure 3:
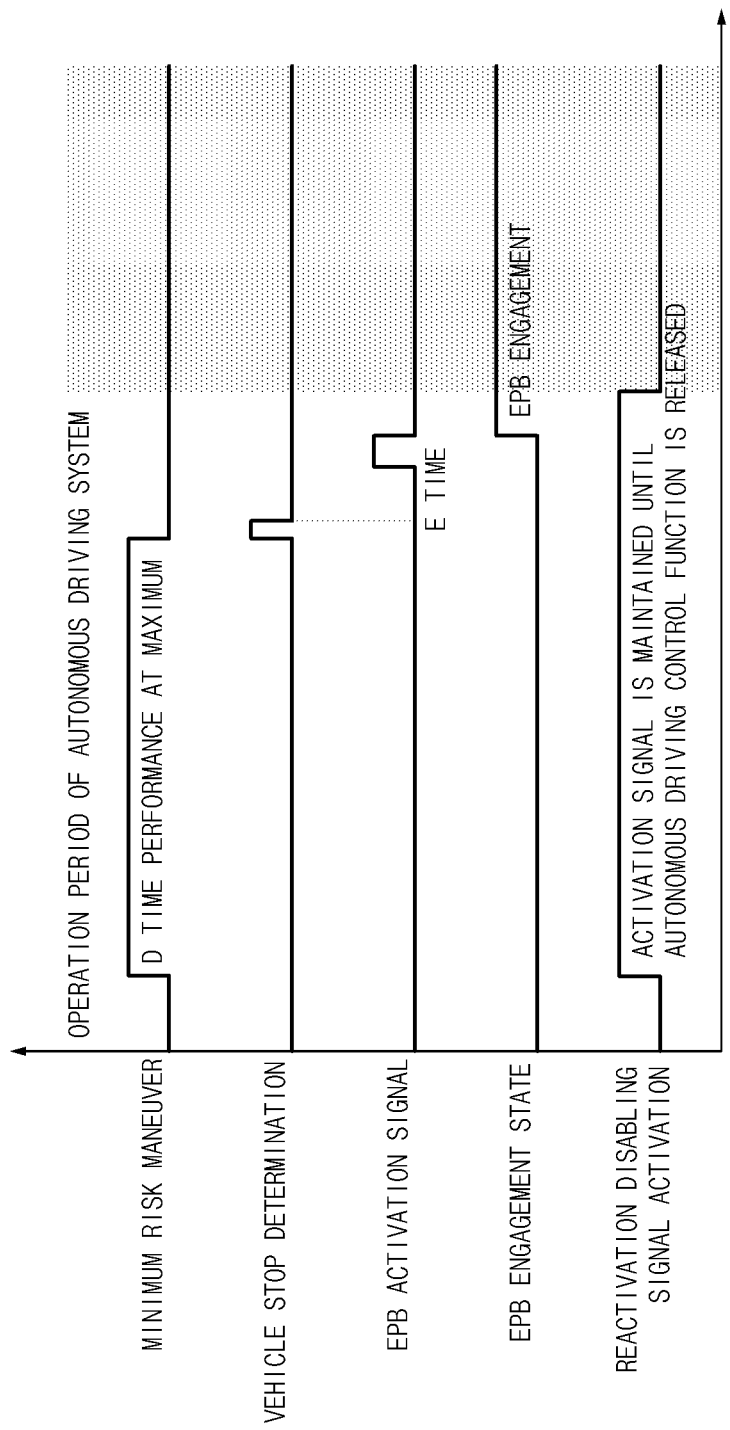
FIG. 3 illustrates an exemplary operation of an autonomous driving control apparatus for a vehicle according to an exemplary form of the present disclosure.

FIG. 3 illustrates an exemplary operation of an autonomous driving control apparatus according to an exemplary form of the present disclosure, showing an EPB engagement operation mechanism when the vehicle stops while the minimum risk maneuver is performed.

First, the autonomous driving control apparatus 100 performs the minimum risk maneuver for a predetermined time (e.g., up to 30 s at the maximum), and decelerates the vehicle to a constant deceleration (e.g., 1 m/s$^2$) before the vehicle stops to transmit an EPB activation signal after a predetermined time (e.g., 1 s) after the vehicle stops.

In this case, when the minimum risk maneuver is started, the signal for reactivation of the autonomous driving control function may be activated, the autonomous driving control apparatus 100 may transmit the signal for disabling reactivation of the autonomous driving control function to the input device 250, the output device 300, a device related to the autonomous driving control function in the vehicle, and/or the like, and the output device 300 may output a guide message to the user that reactivation is not possible before restarting.

The autonomous driving control apparatus 100 determines whether the vehicle is stopped based on a wheel speed of the vehicle after stop control of the vehicle is performed after the minimum risk maneuver ends, and transmits an EPB activation signal to the electronic parking brake control device 400 when it is determined that the vehicle is stopped.

When receiving the EPB activation signal, the electronic parking brake control device 400 performs EBP engagement. When the EPB is engaged, the autonomous driving control function ends.

Hereinafter, an autonomous driving control method during minimum risk maneuver driving of a vehicle according to an exemplary form of the present disclosure will be described in detail with reference to FIG. 4A and FIG. 4B, FIG. 4 and FIG. 5 illustrate flowcharts for describing an autonomous driving control method according to an exemplary form of the present disclosure.

Hereinafter, it is assumed that the autonomous driving control apparatus 100 of the vehicle of FIG. 1 performs the processes of FIG. 4 and FIG. 5. In addition, in the description of FIG. 4 and FIG. 5, operations described as being performed by the device may be understood as being controlled by the processor 130 of the autonomous driving control apparatus 100 of the vehicle.

Figure 4:
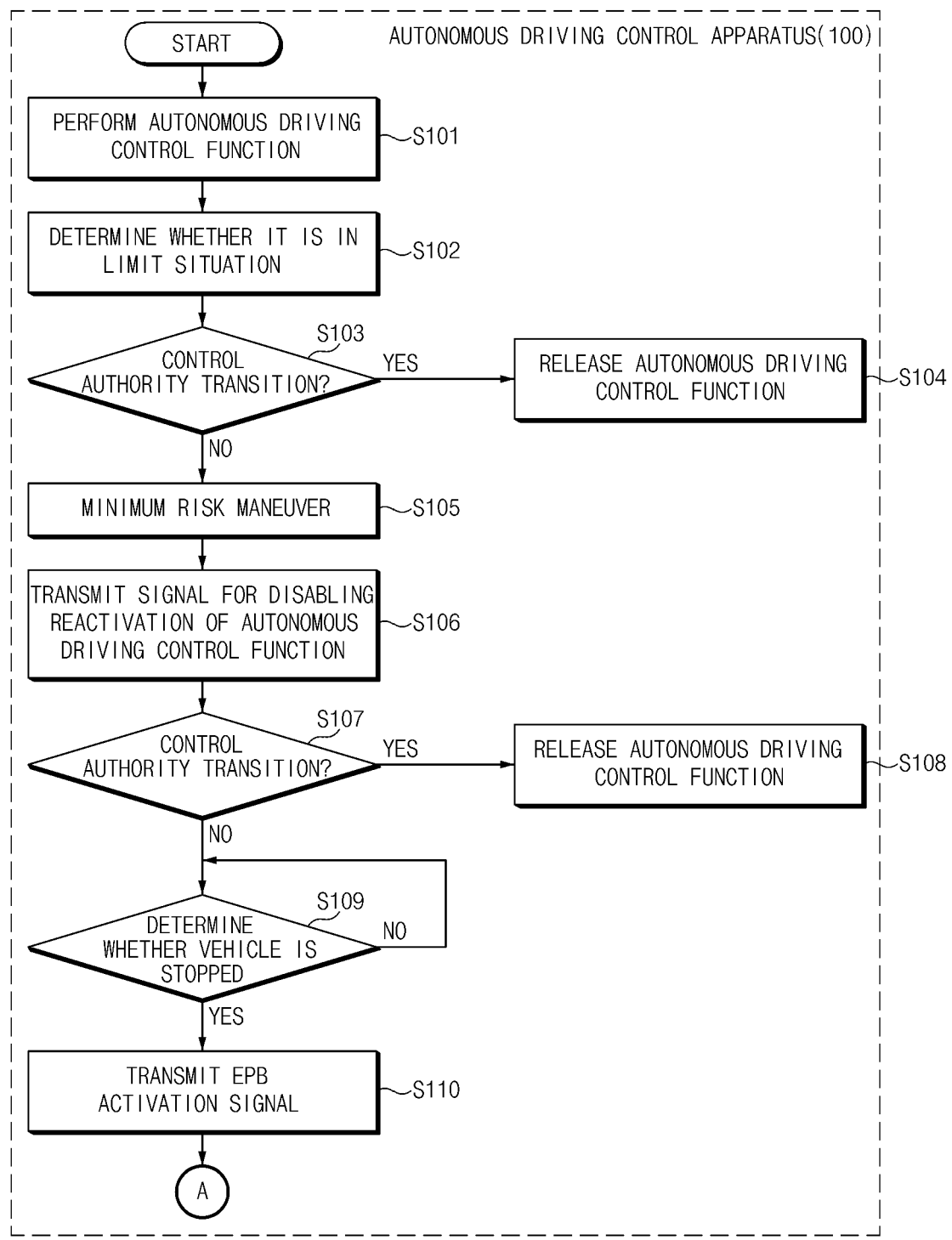
FIGS. 4 and 5 are flowcharts respectively illustrating an autonomous driving control method according to an exemplary form of the present disclosure.
Figure 5:
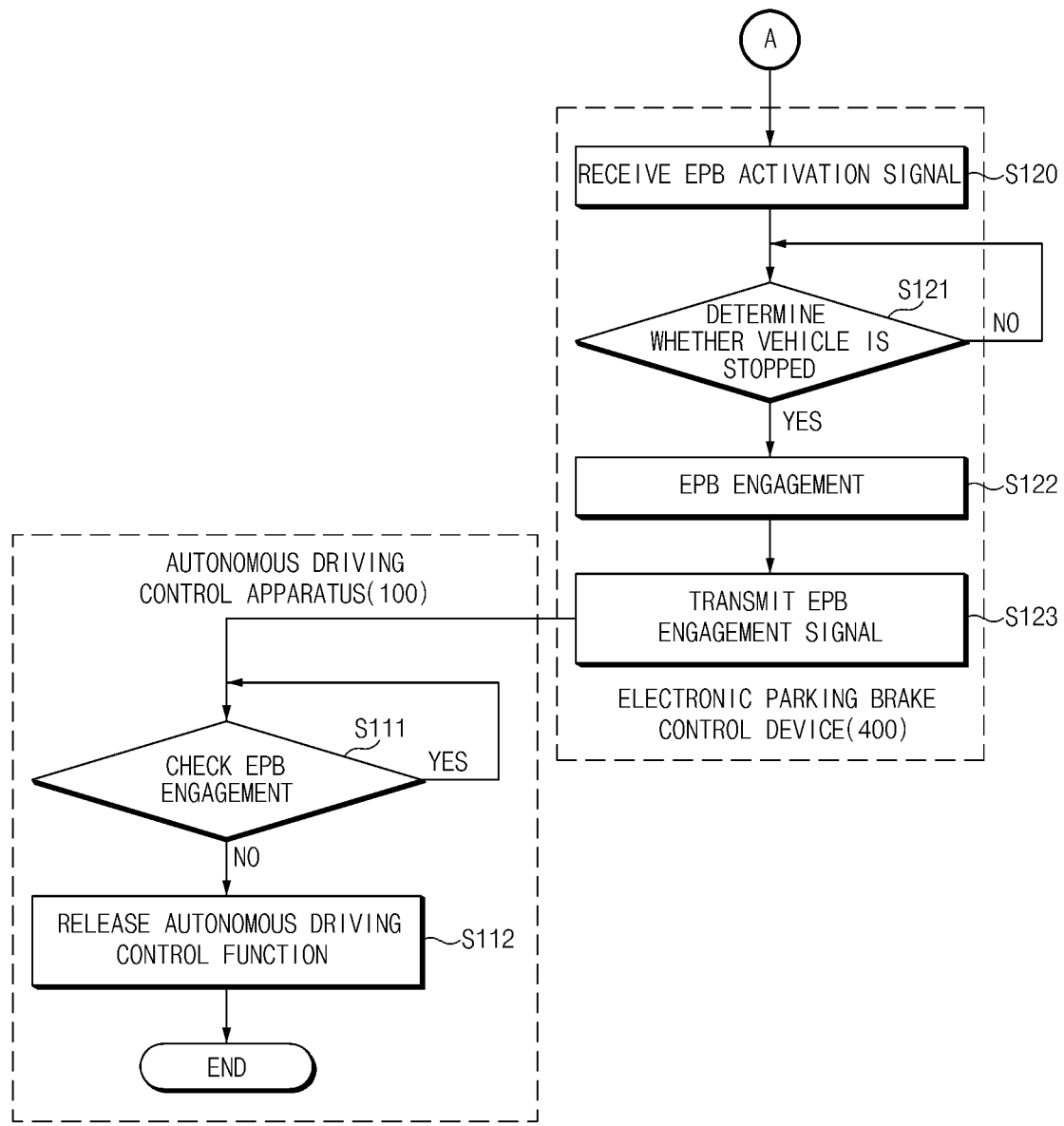

Referring to FIG. 4 and FIG. 5, the autonomous driving control apparatus 100 may determine whether the limit situation has occurred (S102) while performing an autonomous driving control mode (S101). In this case, the limit situation is a situation in which the autonomous driving control function cannot normally operate, and may include, e.g., a situation in which the autonomous driving control function is out of an operating design area.

The autonomous driving control apparatus 100 demands control authority transition in vertical and horizontal direction such that the user can directly control the driving in the limit situation (S103). Accordingly, when the user permits the control authority transition, the autonomous driving control apparatus 100 releases the autonomous driving control mode (S104).

On the other hand, when the user does not permit the control authority transition within a predetermined time (e.g., 10 s) or immediately despite the limited situation, the autonomous driving control apparatus 100 performs the minimum risk maneuver (S105). In this case, the minimum risk maneuver may include performing deceleration at a predetermined speed and stop control.

The autonomous driving control apparatus 100 transmits the signal for disabling reactivation of the autonomous driving control function after the minimum risk maneuver is started (S106). That is, when the autonomous driving control function is released after the minimum risk maneuver is started, the autonomous driving control function can be activated after the vehicle restarts, so the user can be allowed to recognize this by outputting a notification that the autonomous driving control function cannot be reactivated to the output device 300.

Subsequently, the autonomous driving control apparatus 100 may continue to determine whether the control authority transition is permitted during the minimum risk maneuver (S107), and may release the autonomous driving control function when the control authority transition is permitted by the user (S108).

On the other hand, when the control authority transition is not permitted by the user even after the minimum risk maneuver is started, the autonomous driving control apparatus 100 may continue to execute the minimum risk maneuver to perform vehicle stop control after vehicle deceleration, and may determine whether the vehicle is stopped based on the wheel speed of the vehicle when the minimum risk maneuver ends (S109).

When it is determined that the vehicle is stopped, the autonomous driving control apparatus 100 transmits an EPB activation signal to the electronic parking brake control device 400 (S110).

Accordingly, when receiving the EPB activation signal (S120), the electronic parking brake control device 400 determines whether the vehicle is stopped (S121).

When it is determined that the vehicle is in a stopped state, the electronic parking brake control device 400 drives the electronic parking brake device (EPB) 500 to perform automatic engagement (S122).

Subsequently, the electronic parking brake control device 400 transmits an EPB engagement signal to the autonomous driving control apparatus 100 (S123).

Meanwhile, the autonomous driving control apparatus 100 determines whether to perform EPB engagement after transmitting the EPB activation signal in step S110 (S111). That is, the autonomous driving control apparatus 100 checks whether the EPB is engaged by using the EPB engagement signal received from the electronic parking brake control device 400, and automatically releases the autonomous driving control function when the EPB engagement is completed (S112).

As described above, in the present disclosure, an autonomous vehicle determines a risk situation (limit situation) and then demands the control authority transition, and automatically allows the vehicle's electronic parking brake device (EPB) to be engaged and releases the autonomous driving control function when the vehicle is stopped by performing the minimum risk maneuver because the user does not permit the control authority transition.

As such, additional risks that may occur after the autonomous driving control function ends may be prevented by releasing the autonomous driving control function to maintain the vehicle at the stopped state after the EPB is automatically engaged when the vehicle is stopped after the minimum risk maneuver.

Figure 6:
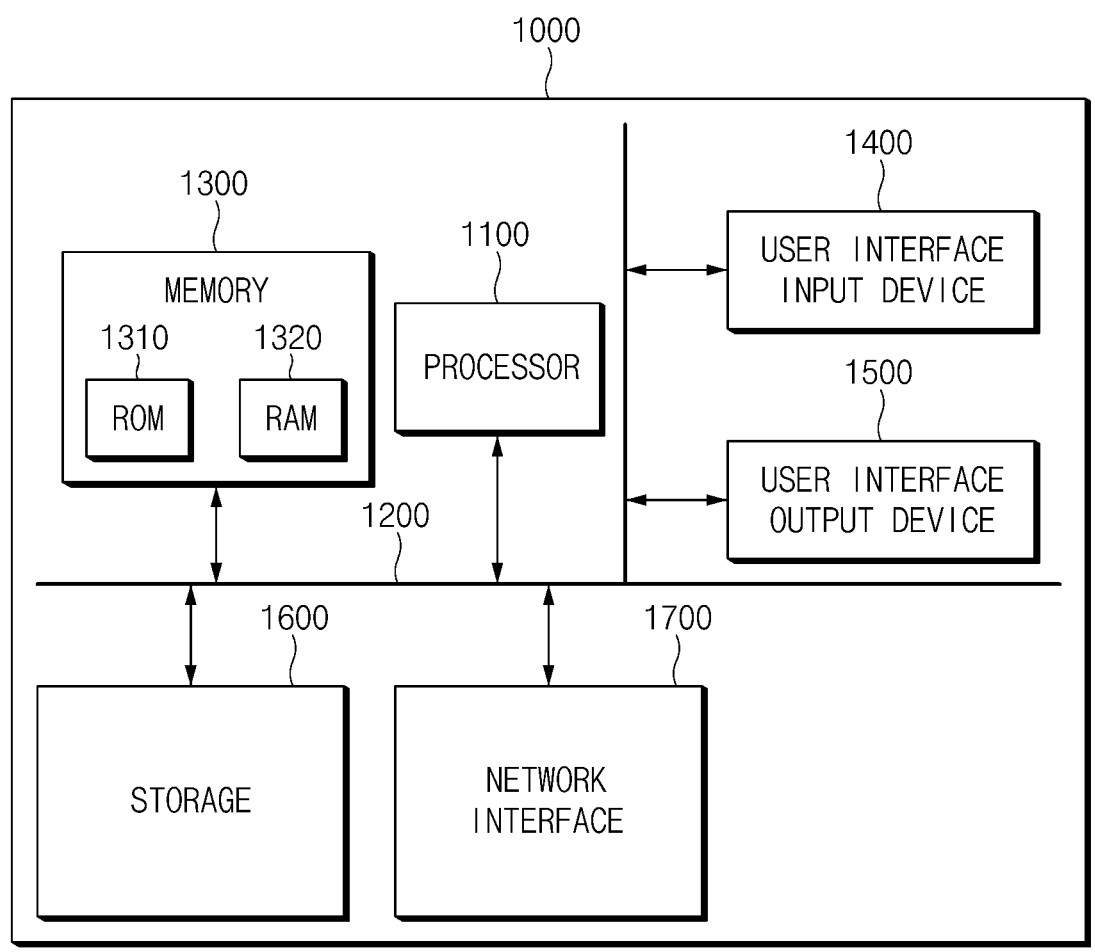
FIG. 6 illustrates a computing system according to an exemplary form of the present disclosure.

FIG. 6 illustrates a computing system according to an exemplary form of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary forms disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms. The protection range of the present disclosure should be interpreted by the claims below, and all technical ideas within the equivalent range should be interpreted as being included in the scope of the present disclosure.

What is claimed is:

1. An autonomous driving control apparatus for a vehicle, comprising:
    a processor configured to:
        determine whether a current driving condition of the vehicle is a limit situation during an autonomous driving control,
        when the limit situation is determined, demand to transfer a control authority to a user of the vehicle,
        when the control authority is not transferred to the user, start a minimum risk maneuver,
        transmit a signal to disable reactivation of the autonomous driving control when the minimal risk maneuver is started, and
        control engagement of an electronic parking brake device when the vehicle is stopped after the minimum risk maneuver ends; and
    a storage configured to store driving condition data of the vehicle and a set of instructions executed by the processor.

2. The autonomous driving control apparatus of claim 1, wherein the processor is configured to determine whether the current driving condition is the limit situation in which the autonomous driving control is disabled based on road information of a road on which the vehicle is running, or sensing information regarding driving conditions of the vehicle.

3. The autonomous driving control apparatus of claim 1, wherein when the control authority is transferred to the user within a predetermined time or immediately after performing the minimum risk maneuver, the processor is configured to stop the autonomous driving control.

4. The autonomous driving control apparatus of claim 1, wherein the processor is configured to determine whether the vehicle is stopped after the minimum risk maneuver ends when the control authority is not transferred to the user within a predetermined time or immediately after performing the minimum risk maneuver.

5. The autonomous driving control apparatus of claim 1, wherein the processor is configured to control transmission of an engagement signal of the electronic parking brake device within a predetermined time or after the vehicle is stopped.

6. The autonomous driving control apparatus of claim 1, further comprising
    a communication device configured to transmit a signal for demanding engagement of the electronic parking brake device.

7. The autonomous driving control apparatus of claim 1, wherein the processor is configured to transmit the signal for disabling reactivation of the autonomous driving control to at least one of an input device for inputting an autonomous driving control command, an output device for outputting an autonomous driving control state, or a device related to the autonomous driving control in a vehicle.

8. A vehicle system comprising:
    an electronic parking brake control device configured to control engagement of an electronic parking brake device of a vehicle; and
    an autonomous driving control apparatus configured to:
        demand to transfer a control authority to a user of the vehicle when a current driving condition is a limit situation during an autonomous driving control,
        start a minimum risk maneuver when the control authority is not transferred to the user,
        transmit a signal to disable reactivation of the autonomous driving control when the minimal risk maneuver is started, and
        control engagement of the electronic parking brake device when the vehicle is stopped after the minimum risk maneuver ends.

9. The vehicle system of claim 8, wherein the electronic parking brake control device is configured to determine whether the vehicle is stopped when the engagement of the electronic parking brake device is demanded.

10. The vehicle system of claim 9, wherein when the vehicle is in a stopped state, the electronic parking brake control device is configured to: allow the electronic parking brake device to be engaged and transmit an engagement completion signal to the autonomous driving control apparatus.

11. The vehicle system of claim 10, further comprising:
    an output device configured to output a signal to demand to transfer the control authority or a signal to disable reactivation of the autonomous driving control, and
    an input device configured to receive an autonomous driving control command from the user.

12. The vehicle system of claim 11, wherein the autonomous driving control apparatus is configured to transmit the signal for disabling reactivation of the autonomous driving control to at least one of the input device, the output device, or a device related to the autonomous driving control in a vehicle.

13. The vehicle system of claim 8, wherein the autonomous driving control apparatus is configured to stop the autonomous driving control when the control authority is transferred to the user within a predetermined time or immediately after performing the minimum risk maneuver.

14. An autonomous driving control method of a vehicle, the method comprising:
    determining, by a processor, whether a current driving condition corresponds to a limit situation while the vehicle is under an autonomous driving control, where the autonomous driving control is restricted in the limit situation;
    when the current driving condition corresponds to the limit situation, demanding, by the processor, to transfer a control authority to a user of the vehicle, and performing a minimum risk maneuver when the transfer of the control authority is not permitted by the user;
    transmitting, by the processor, a signal for disabling reactivation of the autonomous driving control when the minimal risk maneuver is started;
    determining, by the processor, whether the vehicle is stopped after the minimum risk maneuver ends; and
    demanding, by the processor, engagement of an electronic parking brake device when the vehicle is stopped.

15. The method of claim 14, wherein whether the current driving condition corresponds to the limit situation determined based on road information of a road on which the vehicle is driving, or sensing information regarding driving conditions of the vehicle.

16. The method of claim 14, wherein determining whether the vehicle is stopped after the minimum risk maneuver ends includes:
    releasing the autonomous driving control when the control authority is transferred to the user within a predetermined time or immediately after performing the minimum risk maneuver.

17. The method of claim 14, wherein determining whether the vehicle is stopped after the minimum risk maneuver ends includes:
    determining whether the vehicle is stopped after the minimum risk maneuver ends when the control authority is not transferred to the user within a predetermined time or immediately after performing the minimum risk maneuver.

18. The method of claim 14, wherein demanding the engagement of the electronic parking brake device includes:
    transmitting an engagement signal of the electronic parking brake device within a predetermined time or after the vehicle is stopped.

19. An autonomous driving control apparatus for a vehicle, comprising:
    a processor configured to:
        demand to transfer a control authority to a user of the vehicle when a current driving condition is a limit situation during an autonomous driving control,
        start a minimum risk maneuver when the control authority is not transferred to the user,
        ignore a reactivation command of the autonomous driving control inputted from the user while performing the minimum risk maneuver, and
        demand for engagement of an electronic parking brake device when the vehicle is stopped after the minimum risk maneuver ends; and
    a storage configured to store a set of instruction executed by the processor.

20. The autonomous driving control apparatus of claim 19, wherein the processor is configured to perform the reactivation command when the vehicle is stopped after the minimum risk maneuver is started, and the reactivation command is inputted from the user after the vehicle is restarted.

* * * * *